Nov. 26, 1957 W. F. JOHNSTON 2,814,150
TROLLING DEVICE
Filed April 18, 1955

INVENTOR.
WILLIAM F. JOHNSON
BY Arthur I. Robert
ATTORNEY

United States Patent Office 2,814,150
Patented Nov. 26, 1957

2,814,150

TROLLING DEVICE

William F. Johnston, New Albany, Ind.

Application April 18, 1955, Serial No. 501,951

4 Claims. (Cl. 43—43.13)

The present invention relates to trolling devices employed in fishing, and relates in particular to a device for maintaining the lure at the desired depth during trolling.

It is an object to provide a trolling device for use in fishing providing a blade maintained in diving position during trolling and which will shift to non-diving position when a fish is hooked.

Another object is the provision of a trolling device which will not become snagged, because it frees itself when it engages rocks or other objects on the bottom of the body of water.

Another object is the provision of a trolling device providing a diving action which will not spin in action, and thus will not twist the line.

A further object is the provision of a trolling device providing a diving blade which will automatically reset to diving position upon loss of the fish from the hook.

Another object is the provision of a trolling device in which the trolling action can be regulated for deep or shallow trolling.

Another object is the provision of a trolling device which will be maintained in diving position during trolling, and upon hooking a fish, will shift to elevating position to help bring the fish to the surface.

A further object is the provision of a trolling device of relatively simple construction and which is relatively inexpensive to manufacture.

These and other objects will be apparent upon consideration of the following specification taken in connection with the accompanying drawing illustrating a preferred embodiment of the invention by way of example and wherein.

Figure 1:
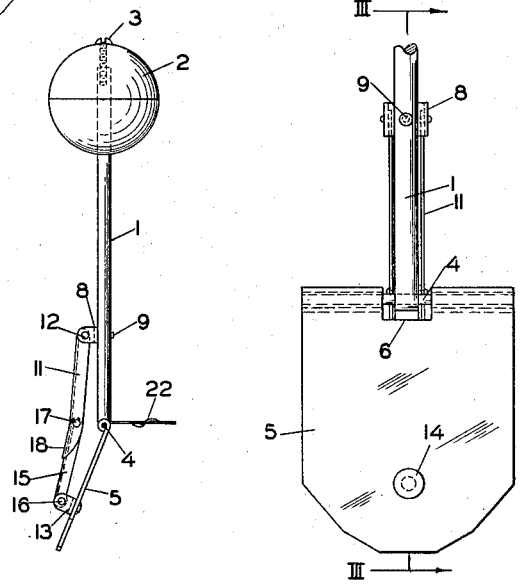
Figure 1 is a side elevation of the trolling device.
Figure 2:
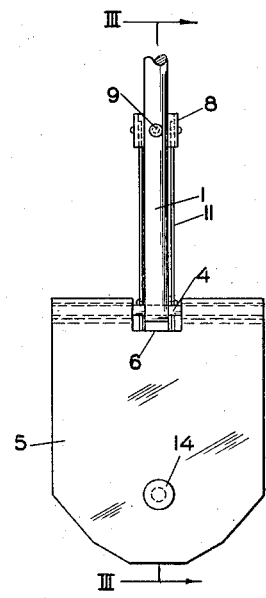
Figure 2 is an enlarged front elevational view of part of the device.

Referring to the drawing, Figure 1, there is shown a stem or rod 1 of suitable length having a float 2 mounted in any suitable manner at its upper end. Preferably stem 1 is a tube or rod of light-weight material, such as aluminum, and the float which may be constructed of cork, or hollow plastic, is attached to the end of the rod by a screw 3, or in any other suitable manner. Adjacent the lower end of the stem is a transverse hinge pin 4, Figures 1 and 2, and a vane 5 of suitable size and shape is swivelled at 2, and a vane 5 of suitable size and shape is swivelled at its upper end to pin 4, as by folding over the end of the vane to form a hinge. The upper end of the vane is cut out at 6 to provide clearance for the stem. A yoke 8 is secured to the stem above pin 4, as by a rivet 9, and a link 11, preferably of channel shape in cross section, is pivoted at one end to the yoke by a pivot pin 12. A similar yoke 13 is secured to the vane 5 by a rivet 14, and a second link 15 is pivoted to this yoke by a pivot pin 16. Links 11 and 15 are pivotally secured together at 17, and link 15 may be of a lesser width than link 11 so as to be received within the flanges thereof. A light spring 18 is wrapped around pivot pin 17 with its arms 19, 20 engaging the links 11, 15 respectively. The spring 18 urges the toggle toward and tends to maintain it in the locked position shown in Figures 1, 3 and 5 wherein its links are more or less in alignment.

Figure 3:
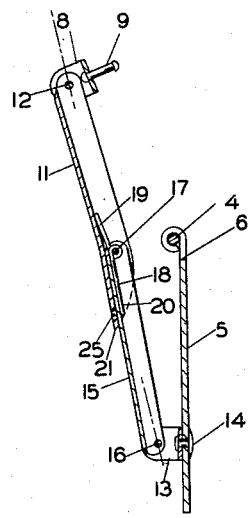
Figure 3 is a fragmentary sectional, and partly diagrammatic view taken on line III—III of Figure 2 on an enlarged scale.

The sum of the length of the links 11 and 15 from pivot 12, through pivot 17 to pivot 16 is less than the distance from pivot 12, through pivot 4 to pivot 16, and the extension 21 of link 11 acts as a stop by engaging link 15 so the links form a locking toggle with pivot 17 to the right of the center line joining pins 12 and 16, to hold the vane 5 at a fixed angular relation to the stem 1 as shown in Figures 1 and 3. This angle may be varied as desired, and is illustrated as being approximately 10 degrees out of alignment with the stem. A loop 22 of wire may be wrapped around hinge pin 4 in the space between the stem and cut out 6 and a trolling line 23, is attached to this loop. The leader 24 carrying the hook is attached to the toggle formed by links 11 and 15, preferably by tying it through a hole 25, in the end 21 of link 11.

This trolling device is constructed so as to provide a predetermined dynamic and static balanced relation. Thus, the buoyancy of the float 2 is selected preferably to bring the device to the surface of the water when it is not being trolled; and the length of stem 1 is such that the float 2 is a substantial distance from the point where the fishing line 23 is attached, this point being approximately the axis about which the device would normally have a tendency to spin without the provision of the float. By locating the float remote from this axis, the float action provides a stabilizing leverage which keeps the device from spinning. The area of the blade is selected to balance the water resistance of the stem and float so as to assume the desired diving angle. It is apparent that the above named relationships are in balance.

I prefer to arrive at this balanced relationship by selecting a float and stem length, to which I attach a blade that has too great an area, and then, by testing the action in the water, and reducing the blade area as required, the proper balance relationship is obtained. Thereafter, the device may be duplicated by duplicating its dimensions.

The depth to which the device dives is determined by the speed at which it is pulled, and the length of line used, and by varying these factors the fisherman can obtain the desired depth.

Figure 5:
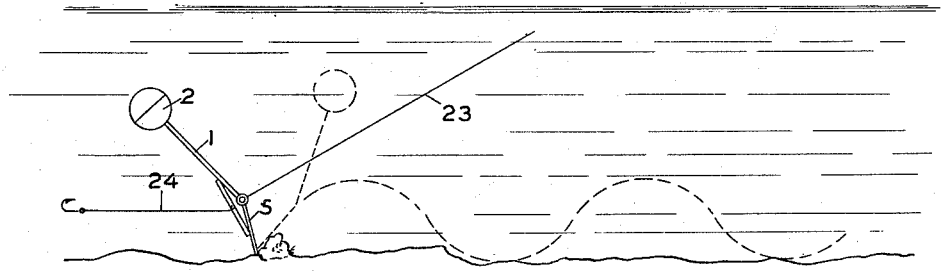
Figure 5 illustrates the deep trolling operation of the device somewhat schematically and therefore omits certain structural details such as the pivots 12 and 16.
Figure 4:
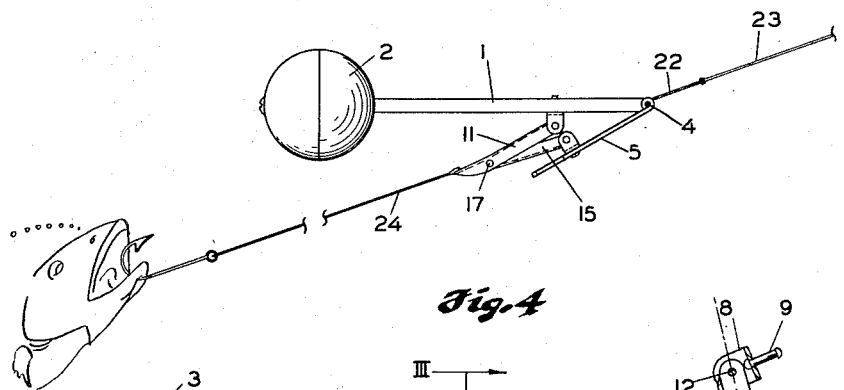
Figure 4 illustrates the operation of the device when a fish is hooked.

The operation of the device is illustrated in Figures 4 and 5. As shown in Figure 5, the tendency during trolling is for the device to dive through the water because of the angular position the device assumes in the water when being trolled. When the trolling device strikes the bottom of the body of water it rebounds, and may follow the course indicated by the sinuous dotted line. The bobbing action of the device helps to attract fish. Should the vane snag on a rock, as illustrated in Figure 5, the bottom edge of the vane will act as a pivot, allowing the stem and float to assume a generally vertical position, for example, as shown by the dotted line position, and the lifting force of the float comes increasingly into action and lifts the device above the obstruction. When the blade clears the obstruction the device resumes its diving position in response to the trolling pull.

When a fish takes the hook, the opposing pull of the fish and trolling line acting on the links 11, 15 breaks the toggle, and the toggle and vane assume the position illustrated in Figure 4, where the vane 5 is substantially parallel with the direction of pull of line 23 and leader 24, and the rod 1 and float are in reclining position. Hence, the vane helps to deflect the device upward toward the surface. Should the fish run with the bait, the trolling device acts as a drag to restrict the pull of the fish.

By using a buoyant float, the device will rise to the surface when trolling movement is stopped, so it may be inspected to see if the bait is intact, or for any other reason. Also, it should be noted, if the fish is lost, the pull on leader 24 is released and the spring 18 resets the trolling device automatically, to the position shown in Figure 1. The toggle links 11, 15 are maintained in locked position by the force of the water exerted against the blade and float, and the spring 18 serves mainly to move or return the links to the locked toggle position.

I claim as my invention:

1. A trolling device for fishing comprising: a stem member; a float adjacent one end of said stem member; a vane hinged to the stem member adjacent the other end; and toggle means movable between locked and broken positions and operating in its locked position releasably to maintain said vane at a predetermined angle relative to said stem member whereby, to cause said device to dive in the water when trolled, said toggle means being adapted to have a fish hook connected thereto whereby the pull of a fish on said hook while a pull is applied to a troll line attached to the device serves to break said toggle.

2. A device as specified in claim 2 wherein: a spring maintains said toggle means in said locked position.

3. A device as specified in claim 1 wherein said toggle means comprises a pair of links, hinged to each other at one end, the other end of one link being hinged to said vane and the other end of the other link being hinged to said stem member.

4. A trolling device for fishing comprising: a float member; a vane member pivoted at one end of said float member; a toggle comprising a pair of links pivotally secured together adjacent one of their respective ends, the other ends of said links being pivoted to said float member and vane, respectively; said links being provided with stop means limiting pivotal movement thereof in one direction to lock said toggle and hold said vane in a fixed diving position, said toggle means being adapted for connection to a fish hook whereby the pull of a fish on said hook while a pull is applied to a troll line attached to the device breaks said toggle and shifts said vane to an elevating position.

References Cited in the file of this patent
UNITED STATES PATENTS

| | | |
|---|---|---|
| 1,408,927 | Bond | Mar. 7, 1922 |
| 1,861,237 | Morgan et al. | May 31, 1932 |
| 2,062,718 | Kallberg | Dec. 1, 1936 |